(12) United States Patent
Weldemariam et al.

(10) Patent No.: US 11,423,775 B2
(45) Date of Patent: Aug. 23, 2022

(54) PREDICTIVE ROUTE CONGESTION MANAGEMENT

(71) Applicant: International Business Machines Corporation, Armonk, NY (US)

(72) Inventors: Komminist Weldemariam, Ottawa (CA); Michael S. Gordon, Yorktown Heights, NY (US); James R. Kozloski, New Fairfield, CT (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 16/515,957

(22) Filed: Jul. 18, 2019

(65) Prior Publication Data

US 2021/0020038 A1 Jan. 21, 2021

(51) Int. Cl.
*G08G 1/01* (2006.01)
*G06N 5/04* (2006.01)

(52) U.S. Cl.
CPC ............ *G08G 1/0145* (2013.01); *G06N 5/04* (2013.01); *G08G 1/0133* (2013.01)

(58) Field of Classification Search
CPC ....... G08G 1/0145; G08G 1/0133; G06N 5/04
See application file for complete search history.

(56) References Cited

U.S. PATENT DOCUMENTS

| | | | | |
|---|---|---|---|---|
| 5,822,712 A * | 10/1998 | Olsson | ................ | G08G 1/0104 340/934 |
| 6,480,783 B1 * | 11/2002 | Myr | ................ | G08G 1/096838 340/990 |
| 8,065,073 B2 * | 11/2011 | Downs | ................ | G08G 1/0104 340/995.13 |
| 9,111,442 B2 * | 8/2015 | He | ........................ | G06Q 10/00 |
| 9,430,942 B2 * | 8/2016 | Blandin | ............... | G08G 1/0133 |
| 9,489,842 B2 * | 11/2016 | Gueziec | ............... | H04W 4/029 |
| 9,751,463 B1 * | 9/2017 | Ramcharitar | .......... | G08G 1/052 |

(Continued)

OTHER PUBLICATIONS

He et al., "A Hybrid Tree and Quantile Regression Method for Incident Duration Prediction", Submitted to TRB 91th Annual Meeting, Jan. 2010, pp. 1-18. (Year: 2010).*

(Continued)

*Primary Examiner* — Luis A Martinez Borrero
(74) *Attorney, Agent, or Firm* — Scully, Scott, Murphy & Presser, P.C.; Shimon Benjamin

(57) ABSTRACT

Methods and systems for predicting congestion duration are described. A processor can detect an occurrence of an incident in an area. The processor can receive context data associated with the area from at least one data source. The processor can execute a prediction engine using the received context data to predict a clearance time indicating a predicted completion time of post-incident activities related to the incident in the area. The processor can determine a congestion duration based on the clearance time. The congestion duration can be an estimated duration of congestion in the area in response to the occurrence of the incident. The processor can compare the congestion duration with a threshold. The processor can select, based on the comparison, at least one operation to optimize an amount of congestion in the area. The processor can execute the selected operations to optimize the amount of congestion in the area.

17 Claims, 6 Drawing Sheets

(56) References Cited

U.S. PATENT DOCUMENTS

| | | | | |
|---|---|---|---|---|
| 9,786,162 | B2* | 10/2017 | Blandin | G08G 1/07 |
| 10,037,689 | B2* | 7/2018 | Taylor | G05D 1/0285 |
| 10,043,323 | B1* | 8/2018 | Konrardy | G07C 5/0808 |
| 10,297,149 | B2* | 5/2019 | Blandin | H04L 67/12 |
| 10,438,126 | B2* | 10/2019 | Subramaniyan | G06F 17/18 |
| 10,469,282 | B1* | 11/2019 | Konrardy | G08B 21/02 |
| 10,672,264 | B2* | 6/2020 | Downs | G08G 1/0112 |
| 2007/0208492 | A1* | 9/2007 | Downs | G08G 1/0104 701/117 |
| 2008/0319639 | A1* | 12/2008 | Yamane | G08G 1/0104 701/118 |
| 2010/0070171 | A1 | 3/2010 | Barbeau et al. | |
| 2011/0043377 | A1* | 2/2011 | McGrath | G06V 20/52 340/905 |
| 2011/0082636 | A1* | 4/2011 | Barker | G08G 1/0104 701/117 |
| 2011/0112747 | A1* | 5/2011 | Downs | G08G 1/0104 701/119 |
| 2011/0173015 | A1* | 7/2011 | Chapman | G08G 1/0104 701/119 |
| 2012/0072096 | A1* | 3/2012 | Chapman | G08G 1/0133 701/117 |
| 2013/0253808 | A1* | 9/2013 | He | G06Q 10/00 701/117 |
| 2015/0073687 | A1* | 3/2015 | Hampapur | G06Q 10/047 701/117 |
| 2015/0073689 | A1* | 3/2015 | Hampapur | G08G 1/0145 701/118 |
| 2015/0088406 | A1* | 3/2015 | Blandin | G08G 1/0125 701/117 |
| 2015/0268055 | A1* | 9/2015 | Gueziec | G08G 1/096827 701/423 |
| 2016/0086285 | A1 | 3/2016 | Peters et al. | |
| 2016/0102993 | A1 | 4/2016 | Nortrup | |
| 2016/0171887 | A1* | 6/2016 | Blandin | G08G 1/0133 701/117 |
| 2016/0189044 | A1 | 6/2016 | Pan et al. | |
| 2017/0314953 | A1 | 11/2017 | Glasgow et al. | |
| 2017/0359197 | A1 | 12/2017 | Stolfus | |
| 2018/0005520 | A1* | 1/2018 | Blandin | G08G 1/07 |
| 2018/0174449 | A1* | 6/2018 | Nguyen | G08G 1/08 |
| 2019/0101914 | A1* | 4/2019 | Coleman, II | G08G 1/0112 |

OTHER PUBLICATIONS

Guan, L. et al., Traffic Incident Duration Prediction Based on Artificial Neural Network, 2010 International Conference on intelligent Computation Technology and Automation, IEEE, pp. 1076-1079, 2010 (Year: 2010).*

Mell et al., "The NIST Definition of Cloud Computing", NIST, Special Publication 800-145, Sep. 2011, pp. 1-7.

Al-Najada et al., "Real-Time Incident Clearance Time Prediction Using Traffic Data from Internet of Mobility Sensors" Nov. 3-10, 2017, pp. 1-8.

Li, et al., "Overview of Traffic Incident Duration Analysis and Prediction", DTU, 2018, pp. 1-13, https://orbit.dtu.dk/files/149877717/filestore_2_.pdf.

Emily McLean, "Do you Have to Stop at Freeway Ramp Lights", Sep. 15, 2017, pp. 1-3, https://www.racv.com.au/membership/member-benefits/royalauto/motoring/information-and-advice/road-rules/racv-road-rules-explains-freeway-ramp-lights.html.

Hajisami et al., "Elastic-Net: Boosting Energy Efficiency and Resource Utilization in 5G C-RANs", Oct. 2, 2017, pp. 1-12, https://arxiv.org/pdf/1710.00731.pdf.

Li et al., "A Hybrid Algorithm for Estimating Origin-Destination Flows", IEEE Access, Nov. 16, 2017, pp. 677-687.

Adina Solomon, "A New Smart Technology Will Help Citites Drastically Reduce Their Traffic Congestion", Paste, Apr. 7, 2017, pp. 1-6.

* cited by examiner

PREDICTIVE ROUTE CONGESTION MANAGEMENT

BACKGROUND

The present application relates generally to computers and computer applications, and more particularly to navigation systems that can be implemented to predict traffic congestion duration.

Various traffic applications can be implemented by devices and systems, such as mobile devices or devices integrated in a vehicle, to determine the presence of traffic congestion in a geographical area or region. These traffic congestions can be caused by incidents such as accidents, events (e.g., weather events), medical emergencies, activities, and/or other types of incidents that can cause additional traffic congestion. Traffic applications can determine the presence of traffic congestion based on crowdsourcing data from different user devices and sensor data from sensors that may be deployed in the geographical area.

SUMMARY

In some examples, a method for predicting a congestion duration is generally described. The method can include detecting, by a processor, an occurrence of an incident in an area. The method can further include receiving, by the processor, context data associated with the area from at least one data source. The method can further include executing, by the processor, a prediction engine using the received context data to predict a clearance time of the incident. The clearance time can be a predicted completion time of post-incident activities related to the incident in the area. The method can further include determining, by the processor, a congestion duration based on the clearance time. The congestion duration can be an estimated duration of congestion in the area in response to the occurrence of the incident. The method can further include comparing, by the processor, the congestion duration with a threshold. The method can further include selecting, by the processor, at least one operation to optimize an amount of congestion in the area. The selecting can be based on the comparison of the congestion duration with the threshold. The method can further include executing, by the processor, the selected operations to optimize the amount of congestion in the area.

In some examples, a system for predicting a congestion duration is generally described. The system can include a memory configured to store a set of instructions. The system can further include a processor comprising hardware, where the processor can be configured to be in communication with the memory. The processor can be configured to execute the set of instructions stored in the memory. The processor can be configured to detect an occurrence of an incident in an area. The processor can be further configured to receive context data associated with the area from at least one data source. The processor can be further configured to execute a prediction engine using the received context data to predict a clearance time of the incident. The clearance time can be a predicted completion time of post-incident activities related to the incident in the area. The processor can be further configured to determine a congestion duration based on the clearance time. The congestion duration can be an estimated duration of congestion in the area in response to the occurrence of the incident. The processor can be further configured to compare the congestion duration with a threshold. The processor can be further configured to select at least one operation to optimize an amount of congestion in the area. The selecting can be based on the comparison of the congestion duration with the threshold. The processor can be further configured to execute the selected operations to optimize the amount of congestion in the area.

In some examples, a computer program product for predicting a congestion duration is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In some examples, traffic applications can notify users of a presence of traffic congestion, road closures, an amount of delay to arrive at a destination, estimated arrival time, and/or other information relating a current context of an area (e.g., a particular roadway). To be described in more detail below, the systems and methods described herein can detect or predict an incident in the area, and determine, based on the current context of the area, an estimated duration of post-incident congestion caused by the detected or predicted incident. In some examples, post-incident congestion can occur due to, for example, 1) various post-incident activities such as clearing debris, toxic materials, or snow off roadways, 2) malfunctioned devices in the area such as traffic lights, 3) entities such as vehicle operators, passengers, or vehicles, requiring attention and assistance, 4) unregulated traffic flow returning to the area of the incident.

The estimated duration of post-incident congestion can be a prediction of a duration of potential congestions caused by post-incident activities. As such, users can be provided with estimated information relating to a future context relating to the incident area, in addition to information relating to the current context of the incident area. Further, the estimated duration of post-incident congestion can be used with crowdsourced information or data to determine whether execution of particular operations is needed. For example, the estimated duration of post-incident congestion can be used to determine whether traffic flow in the area needs to be controlled or regulated (e.g., police needed to direct traffic, control traffic lights, etc.), whether additional resources are needed in the area to ease the traffic flow control (e.g., deploy personnel and resources), or whether entities (e.g., users and vehicles) require assistance (e.g., medical attention, distribution of tangible resources such as gas, power, and/or food).

Figure 1:
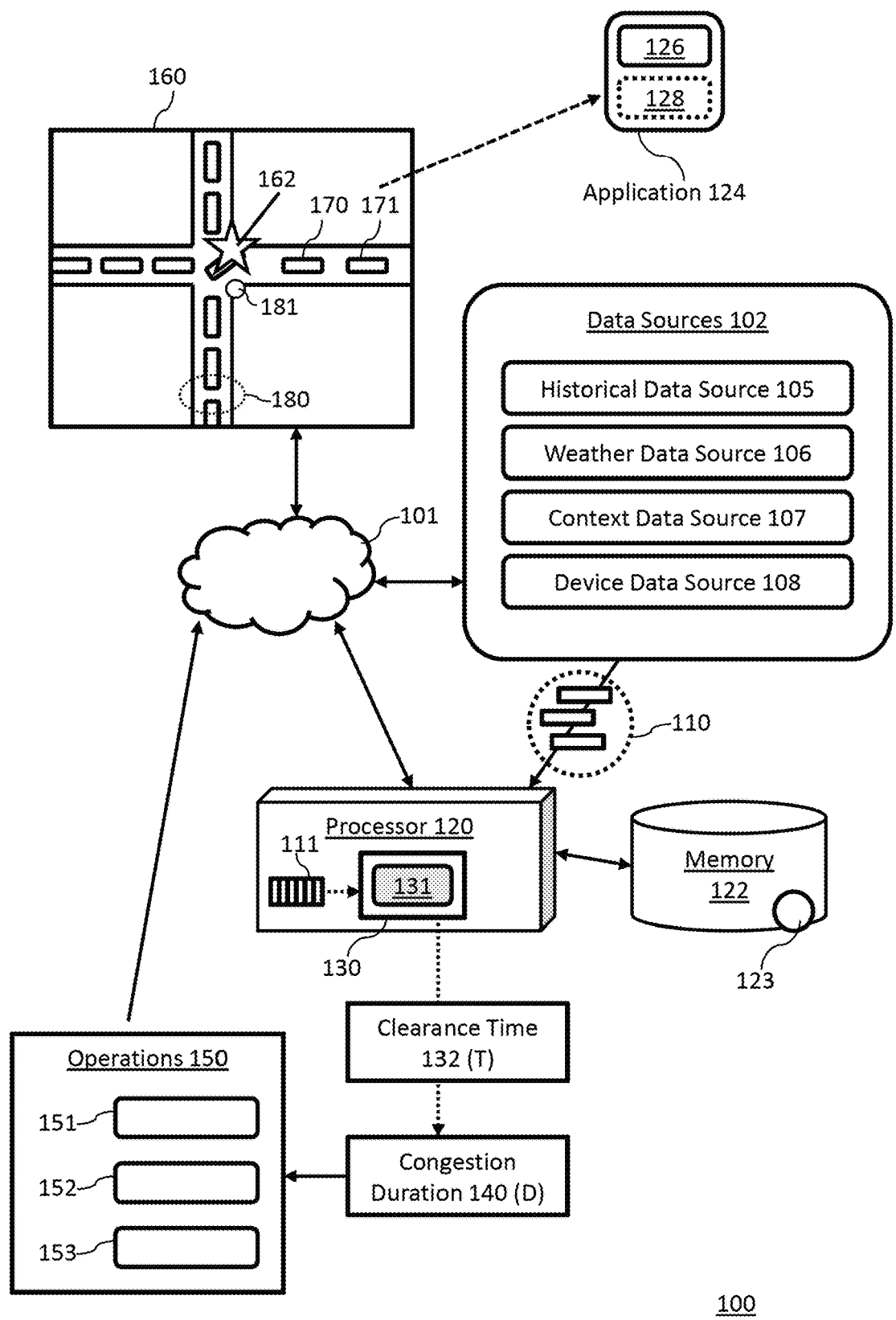
FIG. 1 is a diagram showing an example computer system that can implement predictive route congestion management in one embodiment.

FIG. 1 is a diagram showing an example computer system 100 that can implement predictive route congestion management in one embodiment. The system 100 can include a processor 120 and a memory 122 configured to be in communication with each other. In some examples, the processor 120 and the memory 122 can be components of a computer device such as a server, a desktop or laptop computer, and/or other types of computer devices. The memory 122 can be configured to store instructions 123 including code such as source code and/or executable code relating to an application 124. The instructions 123 can be executed by the processor 120 to perform the methods described in accordance with the present disclosure. The application 124 can be installed on a plurality of devices, such as being installed on a plurality of mobile devices (e.g. a smartphone) as a mobile application.

In an example embodiment, the application 124 can include a first set of executable code (or code) 126 and a second set of executable code (or code) 128, where code 126 and code 128 can be executed independently to perform independent operations. For example, the code 126 can be installed on a device, and can be executed by the device to detect incidents (e.g., traffic incidents, weather incidents) in a geographical location or area, and to provide current context information such as traffic congestion indicators, vehicle speeds, presence of incidents, and/or other types of current context information, corresponding to the current time, to the processor 120. Code 128 being installed on the device can be executed by the device to receive estimations generated based on an execution of instructions 123 by the processor 120, where the estimations can relate to future context information relating to an incident, such as clearance time of an incident and estimated post-incident congestions. In an example embodiment, code 128 may be a plugin to the application 124 such that the processor 120 can distribute code 128 to a plurality of devices already have code 126 but not code 128. As such, the application 124 can be customizable by adding the code 128 to provide the features, such as estimations of future context of an incident area, being described in accordance with the present disclosure. In another example embodiment, the code 126 and the code 128 can be among the same set of executable code of the application 124.

In an example, the processor 120 can detect or predict an occurrence of an incident 162 in a geographical area, or area 160. The incident 162 can be, for example, a traffic incident and/or a weather incident that may cause traffic congestions in the area 160. The area 160 can be, for example, a particular roadway, intersection, landmark, location, and/or other types of physical or geographical locations. The incident 162 can be, for example, an accident, an event, weather conditions (e.g., expected snowfall), one or more activities, road closures, and/or other types of incidents that can cause traffic congestion, for example, standing water, or snow on a roadway. In some examples, the processor 120 can detect or predict the incident 162 by receiving data from devices in the area 160 (e.g., devices and sensors such as weather sensors) through a network 101, where the network 101 can be the Internet. For example, devices associated with one or more entities 170, 171, located in the area 160, can provide data to the processor 120 through the network 101 to notify the processor 120 that the incident 162 can occur, is occurring or has occurred. In examples where the incident 162 is an incident that has occurred or is occurring, the processor 120 can detect or predict the incident 162 by receiving data indicating the occurrence of the incident 162 from data sources such as the media, radio stations, weather stations, or other data sources, through the network 101. For example, a radio station can report that an incident has occurred and the processor 120 can detect the incident by executing various audio signal processing and natural language processing algorithms to extract data indicating an occurrence of the incident. In another example, a weather station can report a weather incident (e.g., an expected amount of snowfall) at a particular time (e.g., rush hour). The processor 120 can predict the weather incident by executing various audio or image signal processing and natural language processing algorithms to predict that traffic congestion may occur at particular areas due to the predicted weather incident at the particular time.

In response to the detection or prediction of the incident 162, the processor 120 can receive, from at least one data source among data sources 102, context data 110 associated with a current context of the incident 162 and/or the area 160. The data sources 102 can include, but not limited to, a historical data source 105, a weather data source 106, a context data source 107, and a device data source 108. In some examples, the context data 110 can include data associated with remote sensors such as satellites, radars, drones, connected cars including self-driving cars, law enforcement officers, crowdsourcing, etc. The processor 120 can be configured to transform or convert one or more portions of the context data 110 into machine readable vectorized matrices (or vectorized matrices) 111, such as by performing vectorization on the context data 110.

In an example embodiment, the processor 120 can include a prediction engine 130, where the prediction engine 130 can be a hardware module, or a software module implemented by hardware components of the processor 120. The processor 120 can be configured to execute or run the prediction engine 130 to predict a clearance time 132, denoted as T, associated with the incident 162 and the area 160. For example, the clearance time 132 can be a predicted or estimated completion time of post-incident activities, such as clearing debris, toxic materials, snow, or completing an accident investigation, from the area 160 of the incident 162. The processor 120 can input the vectorized matrices 111 into the prediction engine 130, and the prediction engine 130 can be configured to implement a prediction model 131 using the inputted vectorized matrices 111 to determine the clearance time 132.

In an example, context data 110 can include numerical vectors arranged as matrices, such as a n×m matrix (n rows, m columns). The processor 120 can perform vectorization on the n×m matrix to convert the n×m matrix into a column vector (vectorized matrix) with k elements (or k rows), where k is a multiplication product of n and m. As a result, the processor 120 can input vectorized matrices 111 converted from the received context data 110 as input feature vectors for the prediction model 131 being implemented by the prediction engine 130 (described below).

In an example embodiment, the prediction engine 130 can be a hardware module, or a software module implemented by hardware components of the processor 120. The prediction engine 130 can be further configured to determine a congestion duration 140 associated with the incident 162 and the area 160, denoted as D, based on the vectorized matrices 111 and/or the clearance time 132. In an example embodiment, the congestion duration 140 can be a difference between the current time and the clearance time 132 ($D_1$), a difference between an occurrence time of the incident 162 and the clearance time 132 ($D_2$), a difference between the current time and a time in which the area 160 is free from congestion ($D_3$), or a difference between an occurrence time of the incident 162 and a time in which the area 160 is free from congestion ($D_4$). The processor 120 can determine $D_1$, $D_2$, $D_3$, $D_4$, depending on a desired implementation of the system 100. For example, if a user of the system 100 wishes to know $D_3$, the processor 130 can be configured to determine $D_3$ based on the vectorized matrices 111.

In some examples, the congestion duration 140 can include an amount of time necessary to complete activities that may occur past the predicted clearance time 132. For example, upon clearing debris off a roadway, certain users or vehicles the area 160 may require assistance such as medical assistance or fuel. The processor 120 can model probabilities of activities that may occur past the predicted clearance time 132, based on the type and severity of the incident 162, and determine the congestion duration 140 based on the probabilities, the clearance time 132, and various data from the data sources 102. For example, the processor 120 can model the fuel consumption of a vehicle under different context, such as different weather. The processor 120 can receive a fuel state of each vehicle in the area 160 and determine a number of vehicles that may be at risk of running out of fuel based on their fuel state and the fuel consumption model. An increase of the number of vehicles running out of fuel may increase the estimation of the congestion duration 140 in the area 160 as vehicles may run of out fuel waiting for an incident to be cleared, causing further traffic.

In some examples, the processor 120 can send the determined congestion duration 140 to devices within the area 160, to provide an estimated congestion duration to the users in the area 160. For example, entities or users within the area 160 can receive the congestion duration 140 and can use the congestion duration 140 to make decisions, such as deciding whether to wait for clearance of the incident 162 or seek an alternative route. In some examples, the processor 120 can send the determined congestion duration 140 to devices outside of the area 160, such as areas that are different from the area 160, to provide a recommendation to users regarding whether to enter the area 160 within the estimated congestion duration 140.

The processor 120 can further determine whether it is necessary to execute one or more operations 150 (including at least operations 151, 152, 152) to control or manage entities and resources in the area 160. For example, the processor 120 can compare the congestion duration 140 with a threshold duration, and based on a result of the comparison, select one or more of operations 151, 152, 153 to be executed, where execution of one or more of the operations 151, 152, 153 can control, manage, and/or modify resources 180, 181 in the area 160. Details of the operations 151, 152, 153 will be provided below. Note that although operations 151, 152, 153 are being shown in the example illustrated by FIG. 1, any arbitrary number of different operations can be available for selection by the system 100 based on the congestion duration 140.

Figure 2:
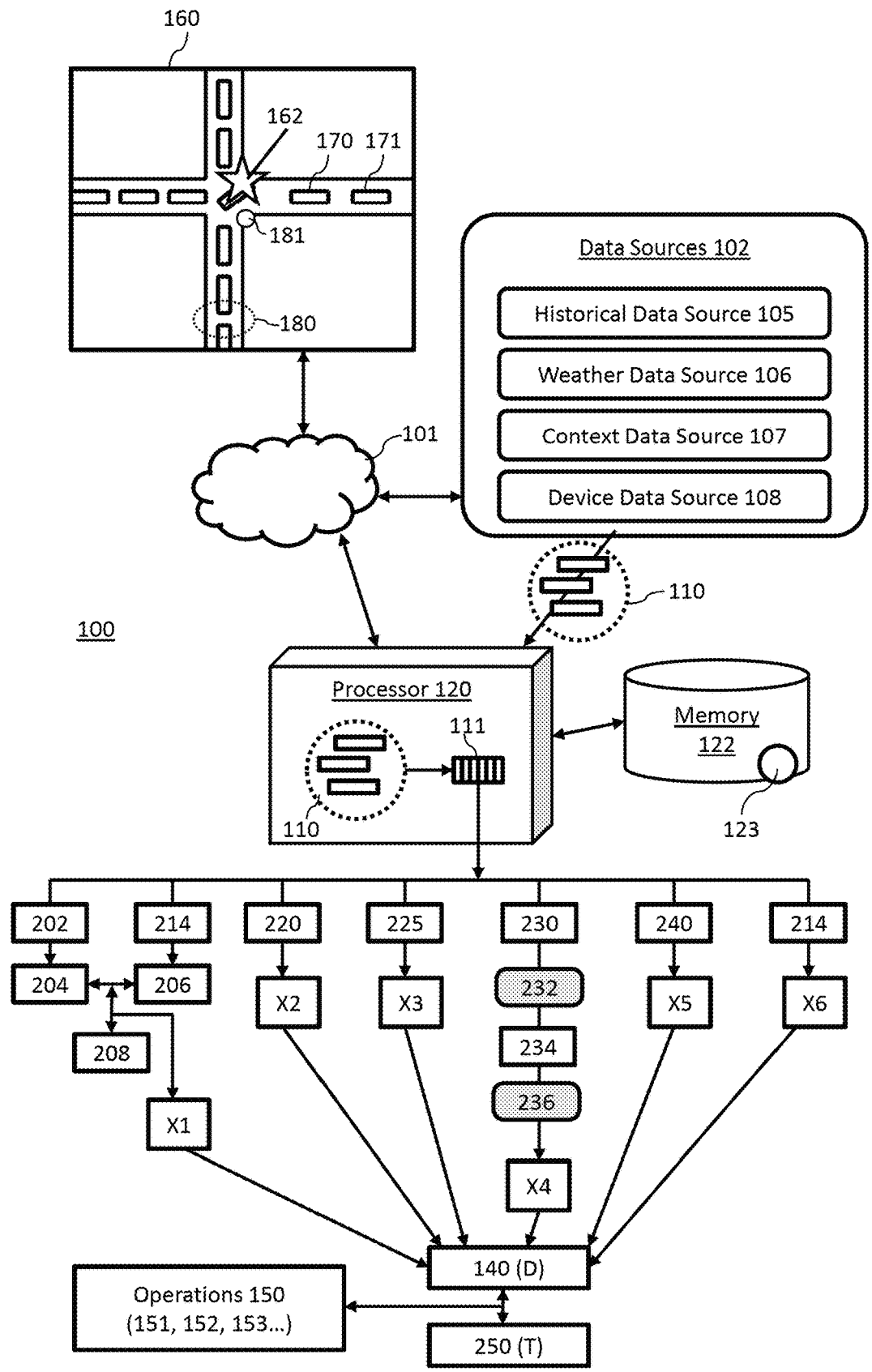
FIG. 2 is a diagram showing an example implementation of predictive route congestion management in one embodiment.

FIG. 2 is a diagram showing an example implementation of predictive route congestion management in one embodiment. FIG. 2 may include components that are labeled identically to components of FIG. 1, which are not described again for the purposes of clarity. The description of FIG. 2 may reference at least some of the components of FIG. 1.

The historical data source 105 can include servers and storage devices configured to store and provide historical data 202, such as historical traffic data indicating traffic flow of one or more portions of a road network and historical incident data, such as date, time, type, locations, duration, of the historical incidents (e.g., incidents that are no long occurring). The processor 120 can estimate usual traffic states indicating typical traffic flow of the area 160, based on the historical traffic data among historical data 202. For example, the historical data 202 can indicate that the area 160 has a significant amount of congestion during morning and evening commute hours, and may be relatively smooth (or congestion-free) during other times of a day. The historical data 202 can be temporal, such as indicating traffic flow of the area 160 across a time span of, for example, one month, multiple months, one year, etc. The processor 120 can determine an usual traffic state 204 of the area 160 by, for example, averaging the historical traffic flow in the area 160 indicated by the historical data 202 received from the historical data source 105.

The device data source 108 can include devices, such as mobile devices and vehicles integrated with computing devices (e.g., car infotainment systems), operated by a plurality of entities or users. The device data source 108 can provide data such as user profiles or user data 230 indicating incident response patterns (e.g., how long will a user have to wait to leave the incident scene) and various vehicle sensor data 214 (e.g., vehicle speed, fuel consumption, fuel level, battery depletion, predicted range, etc.). In an example, the processor 120 can utilize the received vehicle sensor data 214, such as vehicle speeds, to estimate a current traffic state 206 of the area 160. For example, the processor 120 can estimate the current traffic state 206 by applying a probabilistic model to the received vehicle sensor data 214, where the output of the probabilistic model includes classification of roadways into categories such as "congestion" and "congestion-free". In an example embodiment, the traffic states (current or usual) can be indicated by various visual indicators on a map generated by a map application. For example, a roadway that has congestion in the area 160 can be shaded in red, and roadways that have no congestion can be shaded in green, and a roadway with moderate congestion can be shaded in orange. In an example embodiment, the processor 120 can be configured to measure or determine differences between the current traffic state 206 and the usual traffic state 204 of the area 160, and compare the differences with a traffic state threshold 208 (which may be indicated by the instructions 123) to determine a presence of congestion in the area 160. The difference between the current traffic state 206 and the usual traffic state 204 can be, for example, a percentage indicating an amount of different visual indicators between the map of area 160 during the usual traffic state 204 and the map of the area 160 during the current traffic state 206. Note that the data (e.g., 230, 214) being received from the device data source 108 can be encrypted, and permission from owners of these data 230, 214 may be required prior to these data being sent to the system 100.

The processor 120 can detect the occurrence of the incident 162 based on the determined difference between the current or expected traffic state 206 and the usual traffic state 204. For example, if a current time is within commuting hours, the usual traffic state of the area 160 during commuting hours can indicate a presence of congestion, and the current traffic state 206 also indicates a presence of congestion. Thus, the difference between the current or expected traffic state 206 and the usual traffic state 204 may be relatively small, such as, for example, 2%. If the traffic state threshold 208 is, for example, 5%, then the processor 120 can determine the difference of 2% is below the traffic state threshold 208 and determine that an occurrence of an incident is not likely. In another example, if the difference between the current traffic or expected state 206 and the usual traffic state 204 if above the traffic state threshold 208, then the processor 120 can determine a presence of anomaly in the current traffic state 206, where the presence of anomaly may indicate an occurrence of an incident in the area 160. In some examples, the traffic state threshold 208 can be adjustable according to different context. For example, the traffic state threshold 208 during commuting hours can be lower than the traffic state threshold 208 during non-commuting hours, to increase a sensitivity of detecting or predicting incident occurrences during times in which congestion is likely to occur. For example, snowfall during rush hour has a higher likelihood of causing congestion than during other times.

The incident 162 and historical incidents indicated by the historical data 202 received from the historical data source 105 can be represented by numerical vectors arranged in a matrix. The comparison of the traffic state threshold 208 with the difference between the current traffic state 206 and usual traffic state 204 allows the processor 120 to convert this numerical matrix into a machine readable vectorized matrix denoted as X1. The vectorized matrix X1 can represent traffic state associated with the incident 162 and historical incidents indicated by the historical data 202 received from the historical data source 105. For example, the vector X1 can be vectorized into categorical feature set, which can be enumerated as, for example, 0,1,2, to indicate varying levels of traffic states as configured in the system (e.g., 0—smooth, 1—moderately congested, 2—congested, etc.). Other examples of categorical feature can be, for example, binary state such as having a logical '0' to represent "smooth" and a logical "1" to represent congested. In another example, these enumerated states can be values of parameters among data being used to indicate traffic states of particular roadways. For example, a roadway denoted as M can be associated with categorical traffic states such as [M, 0] (which indicates traffic is smooth on road M), [M, 1] (which indicates traffic is moderately congested on road M), and [M, 2] (which indicates traffic is heavily congested on road M). In an example embodiment, the roadway M may be assigned with one or more parameters, such as parameters indicating a particular location of the roadway M (e.g., particular lane, exit number of a highway or freeway, etc.). For example, a categorical traffic state [M, L,1] can indicate that a left (L) lane of roadway M is congested.

The weather data source 106 can include servers, storage devices, web pages, and various weather-related application programming interfaces (APIs) configured to store and provide current and historical weather data 220 at one or more areas, including the area 160. The processor 120 can receive the weather data 220 indicating weather conditions associated with one or more different attributes at a given time and date. In an example, the weather conditions and associated attributes, time, and date can be represented by numerical vectors and arranged in a matrix. The processor 120 can be configured to apply a sliding window algorithm on the numerical vectors representing the received weather data 220 to perform real-time weather predictions of current and future time durations. The predictions outputted by the processor 120 can be a machine readable vectorized matrix denoted as X2.

The historical data 202 received from the historical data source 105 can also include historical clearance time data 225 indicating clearance time of historical incidents at roadway location or area 160. For example, the historical clearance data 225 can indicate durations, such as an amount of time, to clear historical incidents at the area 160. The historical clearance data 225 can be represented by numerical vectors arranged in a matrix. The processor 120 can apply a bi-directional long short-term memory (Bi-LSTM) model on the historical clearance data 225 to generate a machine readable vectorized matrix, denoted as X3. In an example, the vectorized matrix X3 can be, for example, a column matrix including elements indicating clear zones and roadway agencies in the area 160. For example, the vector X3 can include enumerated values of clearance time fetched from roadway agencies that are employed to keep track of clearance time of various incidents.

The device data source 108 can provide data such as user profiles and/or user data 230 indicating incident response patterns. An incident response pattern of a user can be, for example, data indicating how the user may respond to different types of incidents. For example, an incident response pattern can indicate a user may remain in a vehicle to wait for a clearance of an incident 80% of the time, and may seek to exit the roadway with the incident 10% of the time. The incident response patterns of the plurality of users can be based on historical responses and decisions made by the plurality of users to historical incidents. The processor 120 can use the received user data 230 including user profile (e.g., identification of the user, age, and various attributes) and the incident response patterns to train a model 232. In an example, the model 232 can be a word2vec model, and a word2vec model can be a two-layer neural network trained to map texts or words to numerical vectors. For example, the model 232 trained by the processor 120 can be used to produce mappings 234 that map texts or words in the received user data 230 to numerical vectors representing keywords in different incident responses, such as "leave", "exit", "stay", "wait", or other keywords. The mappings 234 generated based on the model 232 can be used by the processor 120 to train a model 236, where the model 236 can be a recurrent neural network (RNN) or a long short-term memory (LSTM) model. The model 236 can be implemented to determine, for example, an amount of time a particular user may take to resolve matter related to the incident 162 based on the particular user's incident response pattern history and negotiation times (denoted as $T_N$). The outputs from the model 236 associated with the plurality of users can be a vectorized matrix denoted as X4.

The context data source 107 can include servers and storage devices configured to store and provide context data 240, such as image data, that can be used by the processor 120 to generate characteristics data (a vectorized matrix denoted as X5) of objects and resources in one or more areas. For example, the context data source 107 can include aerial drones equipped with cameras, and can provide images of different portions of the area 160. In addition, in an example embodiment, fixed camera at locations of occurrences of common accidents can provide additional image data. The processor 120 can receive the images, and apply classification algorithms, such as visual simultaneous localization and mapping (vSLAM) algorithms, convolutional neural networks (CNN), on the images to determine characteristics data X5 of the area 160. Some examples of characteristics that can be indicated by the characteristics data include an amount of traffic lights, stop signs, dimensions (e.g., length, width, shape, number of lanes, etc.) of roadways, resources (e.g., gas stations, food providers, hospitals, etc.) within the area 160.

The processor 120 can receive vehicle sensor data 214 from the device data source 108, such as fuel consumption, fuel level, battery depletion, predicted range, data obtained from polling controlled area network (CAN) protocol, and other types of vehicle sensor data. In some examples, at least some of the vehicle sensor data 214 can be received from autonomous vehicles (e.g., self-driving vehicles) such that the system 100 can monitor context associated with these autonomous vehicles without a need for intervention by operators or occupants of these autonomous vehicles. For example, the sensors of an autonomous vehicle can provide fuel and battery levels to the system 100 without a need for an occupant of the autonomous vehicle to check and provide the fuel and battery levels. The processor 120 can convert the received vehicle sensor data 214 into a vectorized matrix, denoted as X6, that includes parameters associated with the received vehicle sensor data captured in real-time (or the current time).

The processor 120 can use the data in X6 to gather information related to the damage and contextual situation pertaining to a user's profile identified in X4. For example, the vector X6 can include vehicle sensor data associated with a vehicle A, which may be a vehicle involved in the incident 162. The vehicle sensor data can be received by the system 100 at various different times, such as a first time and a second time that is later than the first time. The processor 120 can compare the vehicle sensor data between the first time and the second time to predict an amount of damage on the vehicle A. In an example, the system 100 (or a user of the system 100) can define a default incident resolution time R. If the comparison result indicates a relatively large difference between the sensor data received from different times, the processor 120 can increase a value of R to indicate that additional time may be required to resolve the incident 162. Similarly, if the comparison result indicates a relatively small difference between the sensor data received from different times, the processor 120 can decrease the value of R to indicate that less time may be required to resolve the incident 162.

The processor 120 can use the vectorized matrices 111 (including X1, X2, X3, X4, X5, X6) to determine the clearance time 132. For example, the processor 120 can apply a sigmoid function on the vectorized matrices 111 and associated weights to determine the predicted clearance time 132, and the congestion duration 140 can be a function $f$ of the sigmoid function, such as:

$$D=f(\text{sigmoid}(\alpha X_1+\beta x_2+\chi X_3+\delta X_4+\varepsilon X_5+\phi_6))$$

where $\alpha$ denotes a weight of X1, $\beta$ denotes a weight of X2, $\chi$ denotes a weight of X3, $\delta$ denotes a weight of X4, $\varepsilon$ denotes a weight of X5, and $\phi$ denotes a weight of X6. The function $f$ can be an arbitrary function of an output of the sigmoid function (e.g., clearance time 132). For example, if the system 100 is being implemented to determine the congestion duration 140 as $D_1$ (e.g., difference between the current time $T_{current}$ and the clearance time 132), then a result of the function f can be $D_1 = T - T_{current}$.

In some examples, the processor 120 can implement ensemble learning mechanism, such as using outputs from multiple machine learning algorithms as inputs to the prediction engine 130, to predict the value of clearance time 132. For example, the vector X4 can be determined based on prediction of roadside data from LSTM-RNN model, and the vectors X1, X2, X3, X5 can be based on data outputted by other image processing or visual analytics models such as convolutional neural networks. The processor 120 can input the vectors X1, X2, X3, X4, X5, and X6 into the prediction engine 130, which can be running, for example, a deep neural network, to generate an output that is categorized into multiple threshold ranges of the predicted clearance time T. In another example embodiment, the prediction engine 130 can be configured to implement the sigmoid function being applied on the vectorized matrices 111. The sigmoid function can be switched from 0 to 1 in response to the vectorized matrices 111 being inputted into the prediction engine. The predicted clearance time T can be directly proportional to the congestion duration D and the sigmoid function.

The processor 120 can compare the congestion duration 140 (D) with a threshold 250 (denoted as T). The threshold T can be a value (e.g., a time value) configurable by the system 100 or by a user of the system 100. In an example, if the congestion duration D is greater than the threshold T, the processor 120 can execute operations 151, 152, and 153, where for example, the operation 151 can be a traffic control operation, the operation 152 can be a clustering operation, and the operation 153 can be an optimization operation. In another example, if the congestion duration D is less than the threshold T, the processor 120 can executed operations 152 and 153. Thus, a different set of operations can be selected by the processor 120 for execution based on a value of the congestion duration 140.

The operation 151 can be an operation to control or manage entities in the area 160 from the occurrence time of the incident 162 until the area 160 is free from the congestion caused by the incident 162. For example, the processor 120 can detect an electric vehicle in the area 160 may require charging within the next thirty minutes. If the congestion duration 140 is more than thirty minutes, the processor 120 may send a notification to a vehicle charging service to request assistance for the electric vehicle. The system 100 may further provide recommendations and guidance to for assisting the charging service vehicles to reach the area 160, such as recommending alternative routes and requesting personnel to direct traffic leading into the area 160. In another example, if an entity in the area 160 indicates a need for medical assistance, the processor 120 may notify emergency services and may notify transportation agencies to deploy personnel to control traffic in the area 160 such that emergency vehicles can reach the entity requiring medical assistance. In another example, the processor can deploy aerial drones to deliver items such as medicine, food, to entities in the area 160 that may need these items. In another example, a vehicle in the area 160, and at the scene of the incident 162, can designate a destination that may be one-hundred miles away from the area 160, but the sensors from the vehicle indicate that the fuel or battery level of the vehicle is being depleted while the incident 162 is being resolved, causing a predicted battery level to be sufficient for sixty miles. The processor 120 can identify one or more gas or charging stations located within, for example, a thirty-mile radius from the location of the vehicle and provide the identified gas or charging stations to the vehicle as a recommendation. In another embodiment, the processor 120 can identify an optimal speed for the vehicle to travel to maximize its range so that it has a higher probability to reach its destination given low fuel or battery level. In yet another embodiment, the processor 120 can recommend an alternate route to the desired destination where the vehicle will have a higher probability of reaching its destination with low fuel or battery level (e.g. a route that has fewer hills, fewer requirements to stop and start such as fewer stop signs or traffic signals).

The operation 152 can include clustering and/or grouping entities (e.g., vehicles) within the area 160 into one or more time windows for navigating through the area 160. For example, in the example shown in FIGS. 1 and 2, the processor 120 can notify the entity 170 to navigate pass the incident 162 in the area 160 at a first time window, which may be a first range of times, and can notify the entity 171 to navigate pass the incident 162 in the area 160 at a second time window, which may also be a second range of times. In another example, the operation 152 can also include clustering and/or grouping entities (e.g., vehicles) outside of the area 160 into one or more time windows for entering the area 160. For example, the processor 120 can notify a first group of entities outside of the area to enter the area 160 at a first time window, which may be a first range of times, and can notify a second group of entities of the area to enter the area 160 at a second time window, which may also be a second range of times.

The clustering operations of the operation 152 can provide a control of traffic flow within the area 160 and traffic entering the area 160. In an example embodiment, the operation 152 can include executing density-based clustering non-parametric algorithms, such as density-based spatial clustering of applications with noise (DBSCAN), to group a plurality of points (e.g., entities) in a space (e.g., a space defining the area 160), that are considered closely packed together (e.g., points considered as reachable with each other) and marking other points with nearest neighbors that may be unreachable from each other as single outlier points. The plurality of points, or entities, being clustered by the operation 152 can include autonomous vehicles, electric or hybrid vehicles in the area 160. In some examples, the clustering by the operation 152 can include data being received from drone monitoring or sensor monitoring. In another example embodiment, the operation 152 can include executing algorithms such as nonnegative matrix factorization (NMF) of adjacency graphs representing entities in the area 160 and utilizing estimation of origin-destination flows of the entities within the area 160 to perform the clustering.

In an example, the clustering of operation 152 can be based on an activation function (denoted as F) that utilizes a rectified linear unit (ReLU), where F can be a function of a plurality of parameters, and the parameters can include at least a number of vehicles (denoted as $n_v$), time and distance to alternate routes (denoted as $A_t$ and $A_d$, respectively), the distances of vehicles from the incident 162 (denoted as Y), and the congestion duration D. The ReLU function F can be applied to the predicted clearance time T and associated metrics, and can be an activation function of a neural network being implemented by the prediction engine 130. The function F can be denoted as:

$$F(n_v, A_t, A_d, Y, D)$$

The operation 153 can be an optimization operation to minimize possible congestion in the area 160, such that the estimation of the congestion duration 140 can be optimized. For example, entities within the area 160 (e.g., entities 170, 171) can upload their desired destinations. The processor 120 can identify alternative routes to these uploaded destinations from the area 160. The processor 120 can coordinate the traffic flow to these uploaded destinations to minimize congestion. For example, if 75% of the entities in the area 160 need to use a left lane to travel north, and 25% of the entities need to use a right lane to travel south, the processor 120 can notify the entities clearing the incident 162 to make an effort to keep the left lane open such that a majority of the entities can be clear of the location of the incident 162, thus reducing congestion in the area 160. In some examples, the coordination of traffic flow in the area 160 can be based on elastic net regularization techniques.

Figure 3:
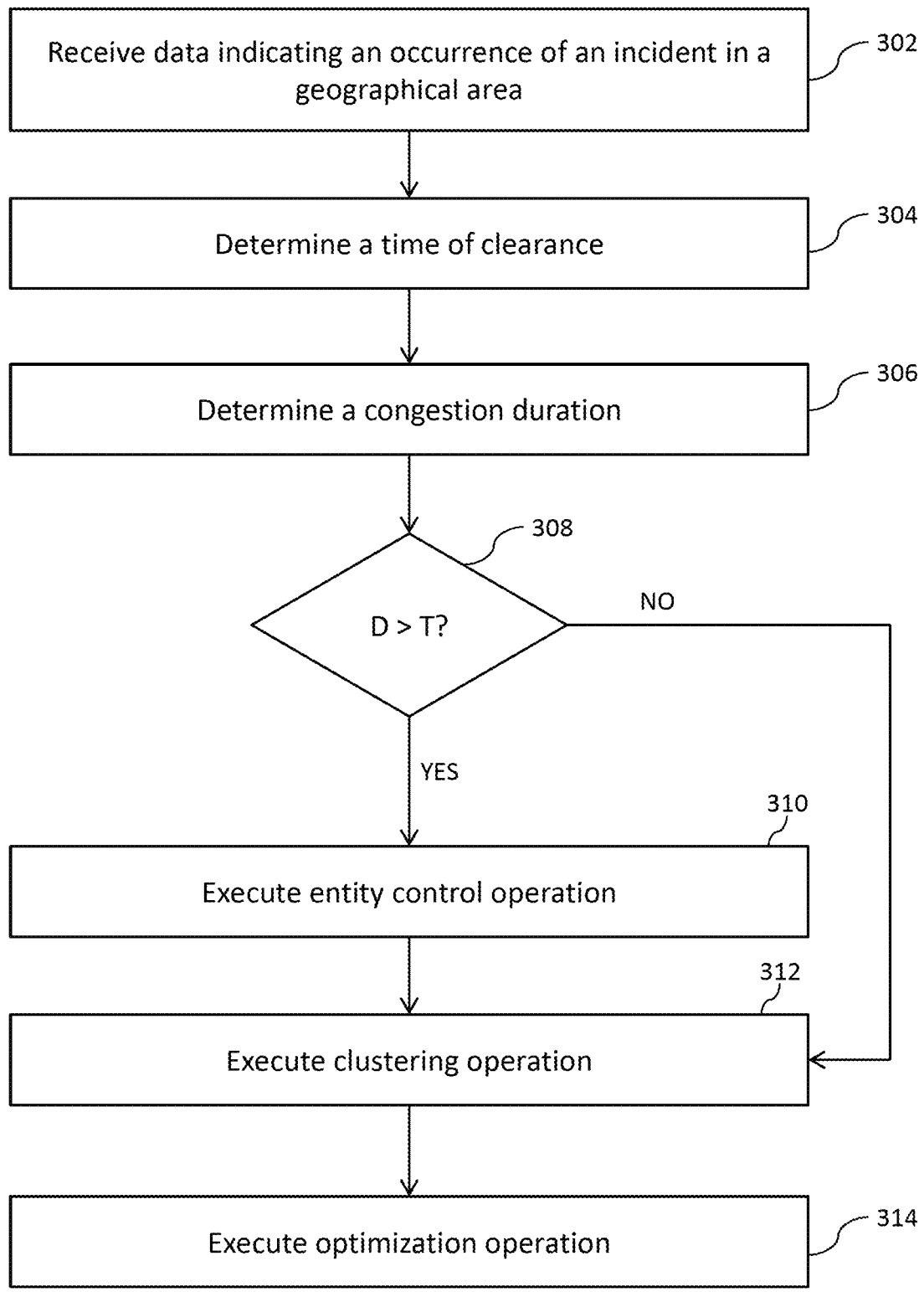
FIG. 3 is a flow diagram illustrating a process relating to predictive route congestion management in one embodiment.

FIG. 3 is a flow diagram illustrating a process relating to predictive route congestion management in one embodiment. An example process may include one or more operations, actions, or functions as illustrated by one or more of blocks 302, 304, 306, 308, 310, 312, and/or 314. Although illustrated as discrete blocks, various blocks may be divided into additional blocks, combined into fewer blocks, eliminated, or performed in parallel, depending on the desired implementation. The description of the flow diagram of FIG. 3 may reference at least some of the components of FIGS. 1-2.

The process can begin from block 302, a processor can receive data indicating an occurrence of an incident in a geographical area. For example, the system 100 or the processor 120 can receive data indicating an occurrence of the incident 162 in the area 160. The process can continue from block 302 to block 304. At block 304, the processor can determine a time of clearance of the incident. For example, the processor can predict a time of clearance time of a location of the incident within the geographical area. The time of clearance can be relative to the incident based on data received from a plurality of data sources, such as data sources that can provide data relating to historical and current traffic, weather, route context, and other incidents, in the geographic area.

The process can continue from block 304 to block 306. At block 306, the processor can determine a congestion duration D based on the time of clearance determined at block 304. For example, the processor can estimate a duration of potential congestion in the area 160 based on the time of clearance determined at block 304. The process can continue from block 306 to block 308. At block 308, the processor can compare the congestion duration D with a threshold T. If the congestion duration D is greater than the threshold T, the process can continue from block 308 to block 310. If the congestion duration D is less than the threshold T, the process can continue from block 308 to block 312.

At block 310, the processor can execute an entity control operation to manage entities within the geographical area (e.g., operation 151). The process can continue from block 310 to block 312. At block 312, the processor can execute a clustering operation (e.g., operation 152) to group entities within the geographical area into different time windows to specify a time to enter the geographical area. The process can continue from block 312 to block 314. At block 314, the processor can execute an optimization operation (e.g., operation 153) to coordinate traffic in the geographical area in order to refine (e.g., reduce or minimize) the congestion duration D determined at block 306, where a minimum value of the congestion duration D is an optimized value. Note that the process can loop back to block 308 from block 314, such that the refined congestion duration D can be compared to the threshold T and the processor can decide whether or not to execute the entity control operation at block 310. Further, the optimization operation at block 314 can be based on results of the entity control operation at block 310 and/or the clustering operation at block 312. For example, the management of entities at block 310 and the clustering operation at block 312 can provide traffic flow control in the geographical area, thus optimizing the congestion duration and an amount of traffic congestion in the geographical area.

In an example embodiment, the application 124 shown in FIG. 1 can include the first set of executable code (or code) 126 and the second set of executable code (or code) 128. The code 126 can be executed by a device or processor (e.g., processor 120) to detect or predict incidents in a geographical location or area, and to provide current context information such as traffic congestion indicators, vehicle speeds, presence of incidents, and/or other types of current context information, corresponding to the current time. The code 128 can be installed on the device and can be executed by the device to perform the operations shown by the flow chart in FIG. 3. For example, the code 126 can be executable code for a traffic map application installed on a mobile device, and the code 128 can be a plugin for the traffic map application that can be executable by the mobile device to perform the operations in the flow chart of FIG. 3. As such, the installation of the plugin (code 128) provides the additional feature of providing a future context of an incident scene without a need to modify source code and/or executable code associated with the traffic map application.

Figure 4:
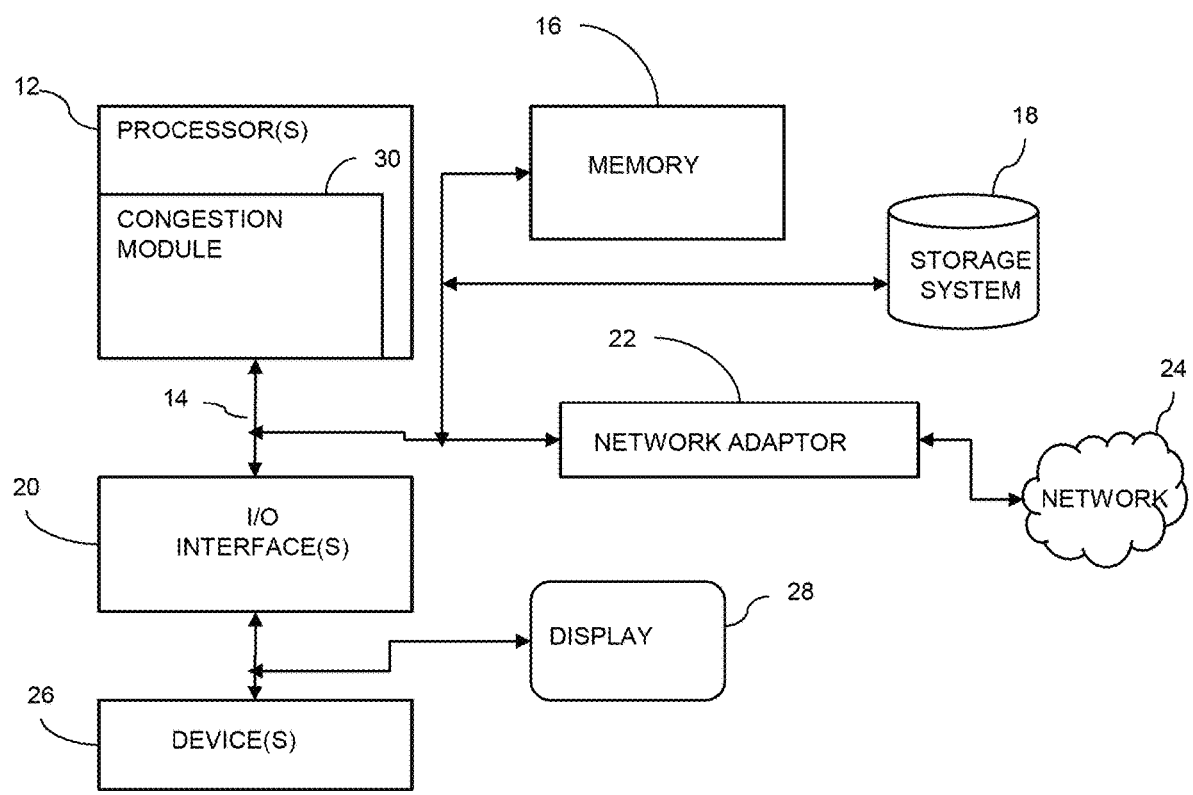
FIG. 4 illustrates a schematic of an example computer or processing system relating to predictive route congestion management in one embodiment.

FIG. 4 illustrates a schematic of an example computer or processing system relating to predictive route congestion management in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., congestion module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 5:
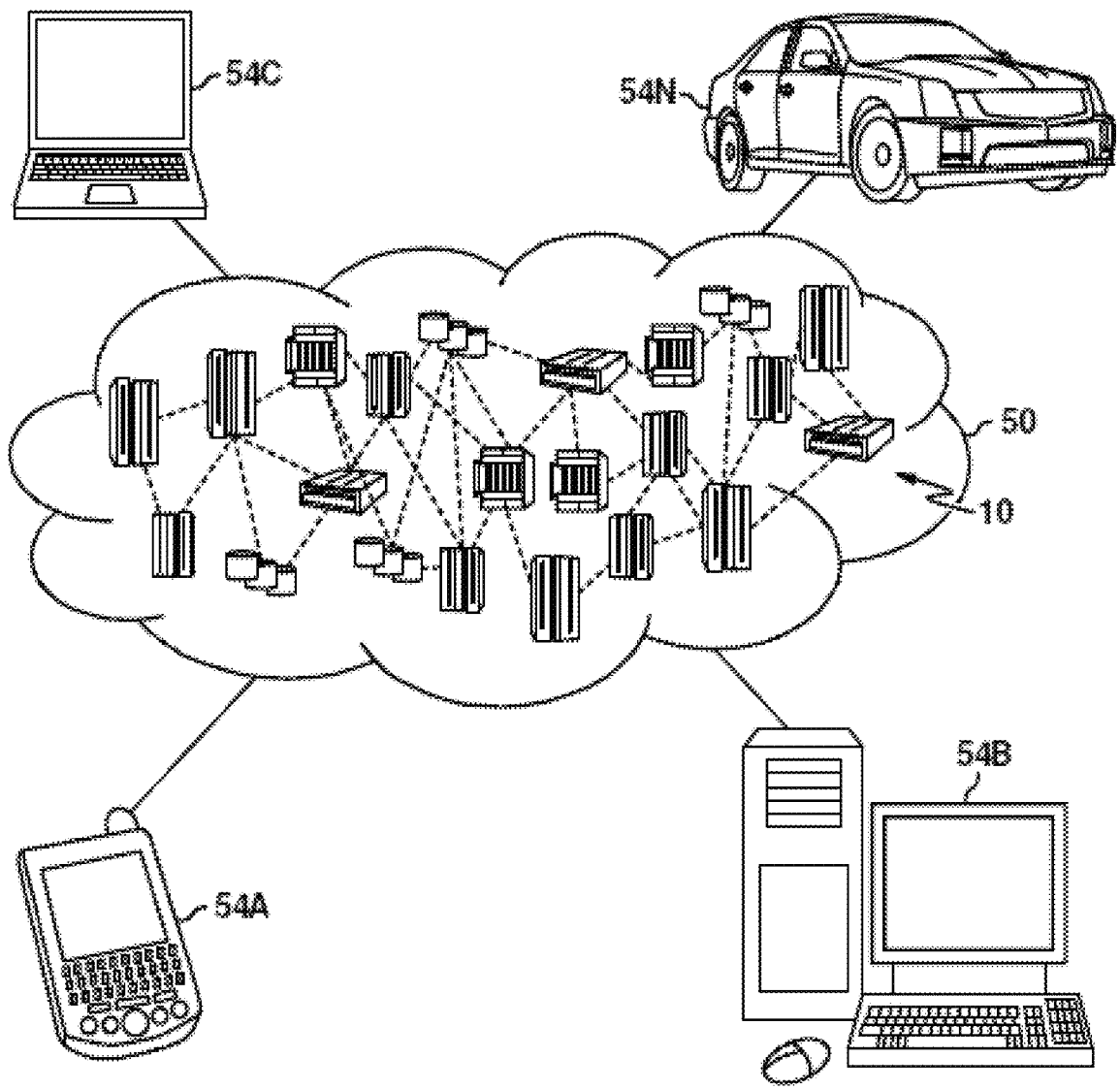
FIG. 5 depicts a cloud computing environment according to an embodiment of the present invention.

FIG. 5 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
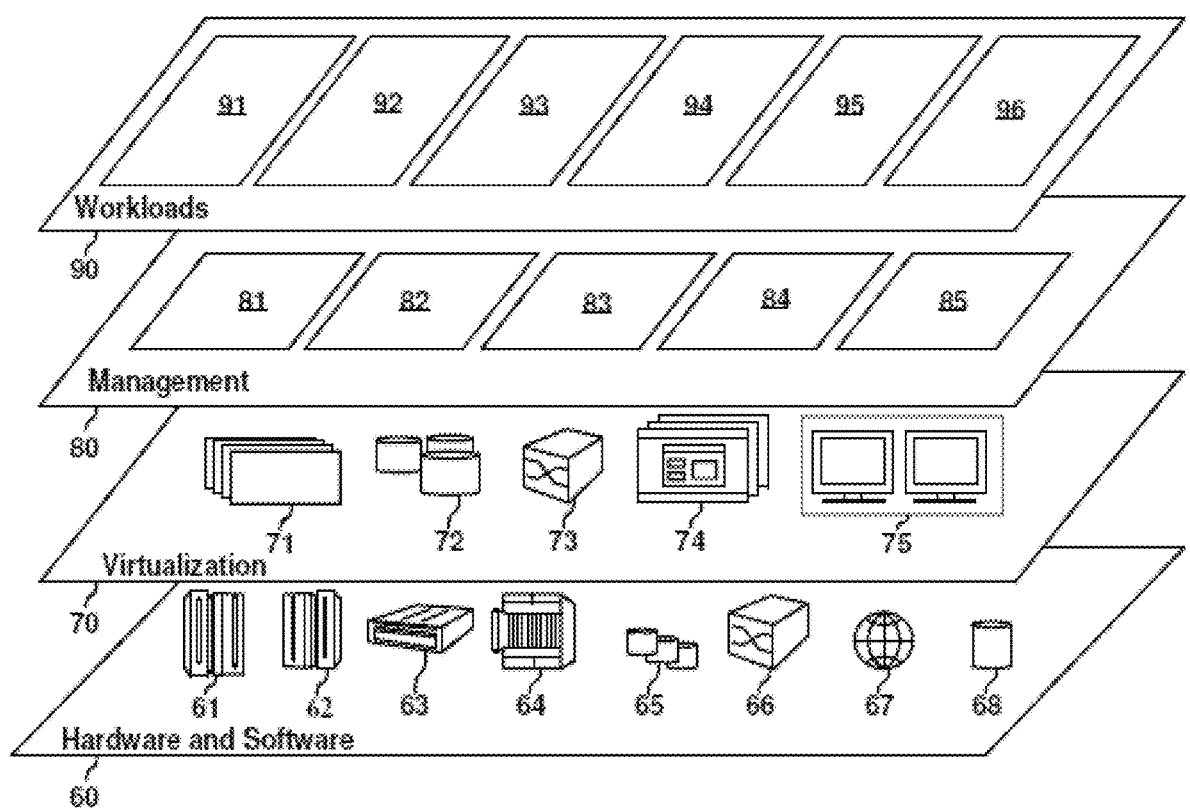
FIG. 6 depicts abstraction model layers according to an embodiment of the present invention.

FIG. 6 depicts abstraction model layers according to an embodiment of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and congestion prediction 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
   detecting, by a processor, an occurrence of an incident in an area;
   receiving, by the processor, context data associated with the area from at least one data source;
   converting, by the processor, the context data into machine-readable vectorized matrices;
   inputting, by the processor, the machine-readable vectorized matrices into the prediction engine;
   executing, by the processor, a prediction engine to run a deep neural network on the machine-readable vectorized matrices to predict a clearance time of the incident, wherein the clearance time is a predicted completion time of post-incident activities related to the incident in the area;
   determining, by the processor, a congestion duration based on the clearance time, wherein the congestion duration is an estimated duration of congestion in the area in response to the occurrence of the incident;
   comparing, by the processor, the congestion duration with a threshold;
   selecting, by the processor, at least one operation to optimize an amount of congestion in the area, wherein the selecting is based on the comparison of the congestion duration with the threshold; and
   executing, by the processor, the selected operations to optimize the amount of congestion in the area.

2. The computer-implemented method of claim 1, wherein the at least one operation comprises:
   an entity control operation to manage entities within the area;
   a clustering operation to group the entities within the area into different time windows for navigating and entering the area; and
   an optimization operation to minimize the congestion duration.

3. The computer-implemented method of claim 2, in response to the congestion duration being greater than the threshold, selecting the at least one operation comprises selecting the entity control operation, the clustering operation, and the optimization operation.

4. The computer-implemented method of claim 2, in response to the congestion duration being less than the threshold, selecting the at least one operation comprises selecting the clustering operation and the optimization operation.

5. The computer-implemented method of claim 2, wherein executing the entity control operation comprises:
   receiving, by the processor, device data indicating a need of an entity;
   providing, by the processor, goods and services to the entity to fulfill the need.

6. The computer-implemented method of claim 2, wherein the clustering operation comprises execution of at least one of:
   a density-based spatial clustering of applications with noise (DBSCAN); and
   an activation function that utilizes a rectified linear unit (ReLU).

7. The computer-implemented method of claim 2, wherein the optimization operation comprises execution of an elastic net regularization technique.

8. A system comprising:
   a memory configured to store a set of instructions;
   a processor comprising hardware, the processor is configured to be in communication with the memory, and the processor being configured to execute the set of instructions stored in the memory to:
   detect an occurrence of an incident in an area;
   receive context data associated with the area from at least one data source;
   convert the context data into machine-readable vectorized matrices;
   input the machine-readable vectorized matrices into the prediction engine;
   execute a prediction engine to run a deep neural network on the machine-readable vectorized matrices to predict a clearance time of the incident, wherein the clearance time is a predicted completion time of post-incident activities related to the incident in the area;
   determine a congestion duration based on the clearance time, wherein the congestion duration is an estimated duration of congestion in the area in response to the occurrence of the incident;
   compare the congestion duration with a threshold;
   select at least one operation to optimize an amount of congestion in the area, wherein the selecting is based on the comparison of the congestion duration with the threshold; and
   execute the selected operations to optimize the amount of congestion in the area.

9. The system of claim 8, wherein the at least one operation comprises:
   an entity control operation to manage entities within the area;
   a clustering operation to group the entities within the area into different time windows for navigating and entering the area; and an optimization operation to minimize the congestion duration.

10. The system of claim 9, in response to the congestion duration being greater than the threshold, the processor is configured to select the entity control operation, the clustering operation, and the optimization operation.

11. The system of claim 9, in response to the congestion duration being less than the threshold, the processor is configured to select the clustering operation and the optimization operation.

12. The system of claim 9, wherein an execution of the entity control operation comprises:
  receive, by the processor, device data indicating a need of an entity;
  provide, by the processor, goods and services to the entity to fulfill the need.

13. The system of claim 9, wherein an execution of the clustering operation comprises execution of at least one of:
  a density-based spatial clustering of applications with noise (DBSCAN); and
  an activation function that utilizes a rectified linear unit (ReLU).

14. The system of claim 9, wherein execution of the optimization operation comprises execution of an elastic net regularization technique.

15. A computer program product for predicting a congestion duration, the computer program product comprising a non-transitory computer readable storage medium having program instructions embodied therewith, the program instructions executable by a processor of a device to cause the device to:
  detect an occurrence of an incident in an area;
  receive context data associated with the area from at least one data source;
  convert the context data into machine-readable vectorized matrices;
  input the machine-readable vectorized matrices into the prediction engine;
  execute a prediction engine to run a deep neural network on the machine-readable vectorized matrices to predict a clearance time of the incident, wherein the clearance time is a predicted completion time of post-incident activities related to the incident in the area;
  determine a congestion duration based on the clearance time, wherein the congestion duration is an estimated duration of congestion in the area in response to the occurrence of the incident;
  compare the congestion duration with a threshold;
  select at least one operation to optimize an amount of congestion in the area, wherein the selecting is based on the comparison of the congestion duration with the threshold; and
  execute the selected operations to optimize the amount of congestion in the area.

16. The computer program product of claim 15, wherein the at least one operation comprises:
  an entity control operation to manage entities within the area;
  a clustering operation to group the entities within the area into different time windows for navigating and entering the area; and
  an optimization operation to minimize the congestion duration.

17. The computer program product of claim 16, wherein the program instructions are further executable by the processor of the device to cause the device to:
  in response to the congestion duration being greater than the threshold, select the entity control operation, the clustering operation, and the optimization operation; and
  in response to the congestion duration being less than the threshold, select the clustering operation and the optimization operation.

* * * * *